United States Patent [19]

Weidler

[11] Patent Number: 5,295,647
[45] Date of Patent: Mar. 22, 1994

[54] PIPE SUPPORT AND HANGER SYSTEM AND METHOD OF MAKING

[76] Inventor: Warren L. Weidler, Rte. 1, Box 107A, Florence, Tex. 76527

[21] Appl. No.: 941,795

[22] Filed: Sep. 8, 1992

[51] Int. Cl.$^5$ .............................................. E21F 17/02
[52] U.S. Cl. ......................................... 248/62; 29/525.1
[58] Field of Search ........................ 248/58, 59, 62, 63; 29/525.1

[56] References Cited

U.S. PATENT DOCUMENTS

| | | | |
|---|---|---|---|
| 1,966,899 | 7/1934 | McCabe | 248/62 |
| 2,944,778 | 7/1960 | Katis | 248/62 |
| 3,493,206 | 2/1970 | Albro | 248/62 X |
| 3,628,760 | 12/1971 | Kindorf | 248/62 X |
| 4,305,557 | 12/1981 | Kowalski | 248/62 |
| 4,461,440 | 7/1984 | Heath | 248/62 X |
| 4,934,634 | 6/1990 | Breeden, Jr. et al. | 248/62 X |

*Primary Examiner*—Ramon O. Ramirez
*Attorney, Agent, or Firm*—Roland H. Shubert

[57] ABSTRACT

A hanger and support system for suspending a tubular body from an overhead support is disclosed. The support takes the form of a thick-walled plastic pipe, suitably PVC, with two end caps adhesively joined thereto. An upper end cap is secured to an anchor in the overhead support by means of a bolt extending through a hole in the closed cap end and is adhesively joined to a pipe end. A second end cap at the other pipe end likewise is provided with a downwardly extending bolt arranged for attachment to a hanger and that second end cap is adhesively joined to the lower pipe end. The hanger is in the form of a generally circular band having overlapping superposed ends with a hole drilled therethrough for attachment to the downwardly extending bolt.

16 Claims, 2 Drawing Sheets

PIPE SUPPORT AND HANGER SYSTEM AND METHOD OF MAKING

BACKGROUND OF THE INVENTION

1. Field of the Invention

This invention relates generally to improvements in pipe support and hanger systems of the kind used to support liquid lines, electrical conduits and similar duct work in buildings and industrial installations.

More particularly, this invention relates to improvements in pipe support and hanger systems which have special advantage for use in corrosive environments.

2. Description of the Prior Art

Pipe support and hanger systems of the prior art typically comprise a support means attached at its upper end to an overhead beam or other structural member and fixed at its lower end to a band or hanger which cradles a pipe, duct or conduit. In most instances, it is desirable and often necessary that the support means be of adjustable length in order to accommodate different elevations of overhead support structures and to allow for the provision of a flow gradient to a supported pipe.

The support means employed by typical prior art pipe hanger systems comprises a rod member which may be exteriorly threaded at each end as is illustrated in U.S. Pat. No. 4,524,935 to Rumble or it may comprise a similar rod exteriorly threaded over its entire length as shown by the Breeden et al patent, U.S. Pat. No. 4,795,115. As is shown by the Rumble patent, the band or hanger which attaches to the lower end of the rod member can take the form of an elongated metal band bent into a generally oval shape with the ends thereof configured to register with the thread pattern of the support rod and to be held in engagement therewith by a ferrule adapted to wedge downwardly over the ends of the band. Another type of pipe hanger comprises a single loop of wire having legs extending from a bight portion of the loop with each leg configured to engage the other leg and to attach to a support rod as is shown by the Breeden et al patent. Another form of pipe hanger is described in U.S. Pat. No. 4,166,600 to Perjes. That hanger comprises a metal strip bent over at its extremities with a buckle arranged to receive the end of a threaded rod and the bent over ends of the metal strip. The end of the threaded rod is inserted through the buckle and is secured thereto by means of a nut which compresses the strip ends between the nut and the buckle. Yet another form of pipe hanger is shown in the Katis patent, U.S. Pat. No. 2,944,778. Katis describes a pipe hanger including a metal strip having enlarged apertured ends bent so as to be in a parallel relationship with the apertures superimposed. A cylindrical flange member is threaded onto a support rod and the apertured hanger ends are fixed onto the rod against the lower flange end by means of a nut threaded onto the support rod.

In some instances, pipe support and hanger systems are placed in wet and otherwise corrosive environments, particularly in industrial and residential construction at coastal sites where the hanger system may be exposed to salt spray. Metal support rods and pipe hangers corrode rapidly in such environments requiring costly maintenance and frequent replacement. It has been proposed to provide pipe support and hanger systems fabricated entirely of plastic materials which are, by nature, corrosion resistant. One such system is described in the Albro patent, U.S. Pat. No. 3,493,206. the system shown in that patent includes a support rod or tube fabricated of a plastic material and being helically threaded over its entire length. The pipe hanger itself includes a split cradle within which a pipe is held and to which is attached an end of the threaded support rod. The end portions of the cradle are formed as a pair of semi-conical, truncated bosses having sloping exterior surfaces and axially threaded interior surfaces matching the threading of the support rod. The boss portions of the split cradle are secured to the support rod by means of a keeper member which wedges onto the sloping exterior boss surfaces thus maintaining the inner boss surfaces in mating threaded relationship with the support rod. Another pipe hanger system comprising a plastic rod and ring combination is disclosed in U.S. Pat. No. 3,273,837.

There have also been attempts to produce corrosion resistant pipe hanger systems by substituting plastic materials, typically glass fiber reinforced resins, for the metal components of the traditional pipe support and hanger systems. Such substituted materials have so far proven to be structurally inferior and far more costly than the metal systems which they replace.

It can be appreciated that a pipe support and hanger system combining the structural strength and rigidity of a metal system while providing resistance to corrosive environments would provide substantial advantage in the art.

SUMMARY OF THE INVENTION

The pipe hanger system of this invention is formed of a support member which comprises a plastic pipe adapted at a top end with means for attachment to an overhead structure and adapted at the bottom end with means for attachment to a hanger within which a pipe or conduit is supported. The attachment means at each pipe end comprises a pipe end cap through which a hole is drilled. A bolt having a head smaller in diameter than the inside pipe diameter and fabricated of a non-corrosive and non-conductive material is arranged to extend outwardly through the hole in the top end cap for threadable connection to a mating anchor fixed in or to the overhead structure. A similar bolt extends outwardly through the hole in the bottom end cap for connection to a pipe supporting band or hanger which is preferably of generally circular shape with apertures adjacent the ends thereof. The hanger is preferably fabricated from a heavy walled plastic pipe by cutting parallel-sided, cylindrical sections from the pipe and cutting each section longitudinally to form a two-ended generally circular band. Indexed holes are drilled adjacent the band ends for attachment to the bolt which extends through the bottom end cap.

Hence, it is an object of this invention to provide an improved pipe support and hanger system for use in corrosive environments.

It is another object of this invention to provide a vertically adjustable pipe support and hanger system fabricated entirely of non-corrosive and non-conductive materials which is easy and inexpensive to fabricate and install.

Other objects of this invention will be evident from the following description of certain preferred embodiments.

DETAILED DESCRIPTION OF THE INVENTION

Figure 1:
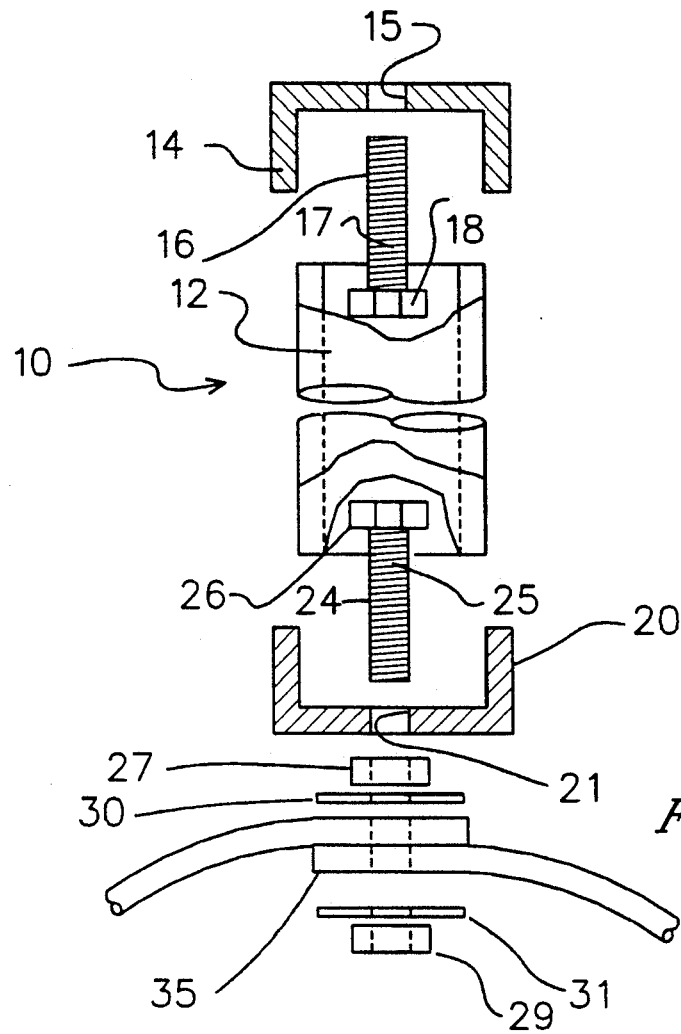
FIG. 1 is an exploded front elevational view in partial section with parts broken away illustrating the pipe support and hanger system of this invention.
Figure 2:
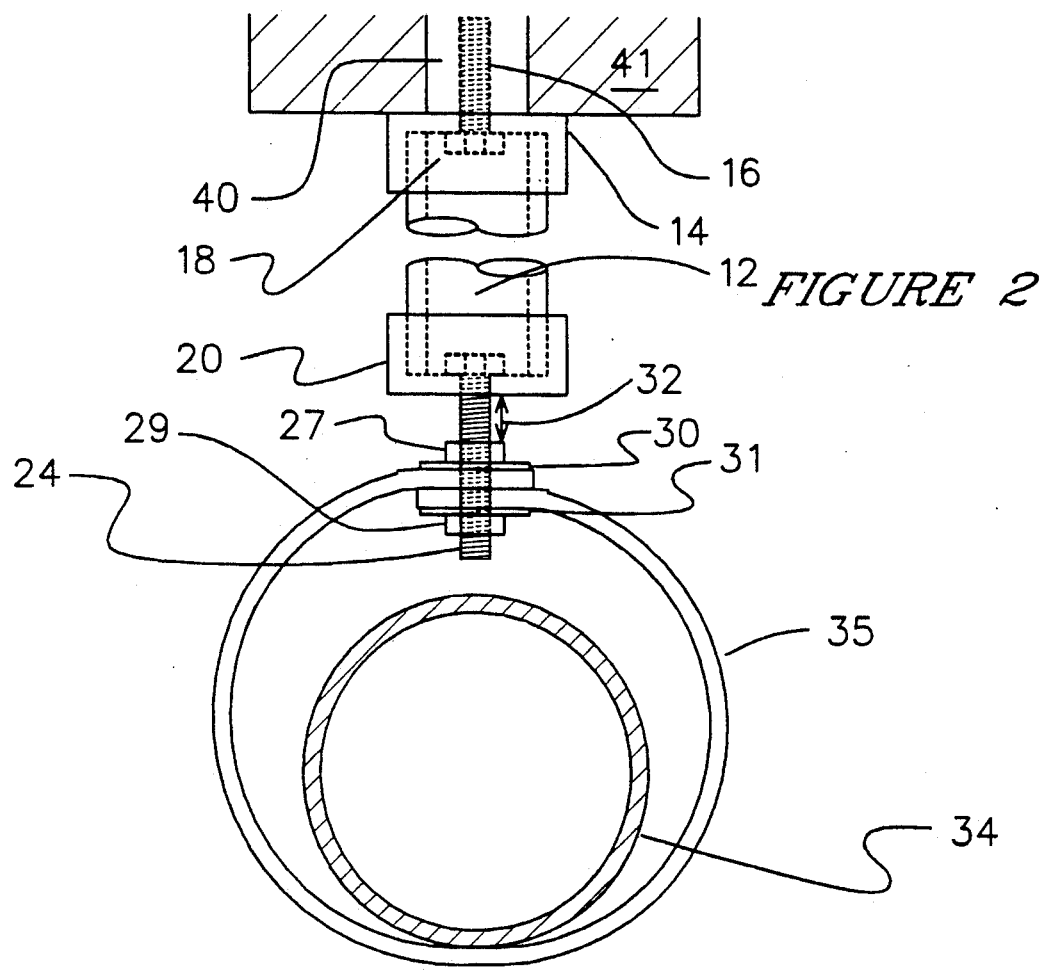
FIG. 2 is a front elevational view of the assembled pipe support and hanger system of FIG. 1.

The invention will be described with reference to the Figures which depict certain preferred embodiments thereof. Referring first to FIGS. 1 and 2 in combination, there is shown generally at 10 the pipe support and hanger system of this invention. The system includes a support member 12 which comprises a heavy-walled, plastic pipe having an inside diameter which may conveniently range from about one-half inch to one inch. The plastic pipe preferably is heavy-walled, polyvinyl chloride (PVC) pipe of the kind used in plumbing service. Schedule 40 PVC pipe rated at 400 psi in cold water service and having an internal diameter of one-half to one inch is well suited for this purpose. Such pipe will typically have a wall thickness of about one-eighth to three-sixteenths of an inch. Pipe 12 is cut to that length needed to support a tubular body such as a duct, pipe, or other conduit, at a desired elevation below an overhead support structure and typically may range from a few inches to several feet in length.

The top end of pipe 12 is arranged for mating insertion into an upper end cap 14. Cap 14 is a cylinder having one closed end to form a cup like member having an inside diameter sized to snugly fit over the outside of pipe 12. It preferably comprises a standard plumbing component ordinarily used to blank off the end of a pipe. A centered hole 15 is drilled through the face of cap 14 so as to allow for the insertion of the threaded shank 16 of bolt 17 having a bolt head 18 through the hole 15 for threaded connection to an anchor 40 (FIG. 2) fixed to a support which may be an overhead structure 41. In similar fashion the bottom end of pipe 12 is arranged for mating insertion into a lower end cap 20. Cap 20 also is provided with a centered hole 21 drilled through the cap face to allow for the insertion of the threaded shank 24 of bolt 25 having a head 26. Bolts 17 and 25 are preferably fabricated from a strong, non-corrosive plastic such as nylon.

A hanger 35 having apertures sized to allow passage of bolt shank 24 therethrough is secured onto bolt 25 by means of first nut 27 and second nut 29. If desired, washer means 30 and 31 may be inserted onto the bolt shank 24 at the top and bottom respectively of hanger 35. The length of bolt 25 is preferably selected such that a space 32 is provided on bolt shank 24 for the vertical adjustment of hanger 35 relative to cap 20. That adjustment allows for convenient maintenance of the desired slope to supported pipe 34 (shown in cross-section). The diameter of hanger 35 is suitably about two inches larger than is the diameter of supported pipe 34 so as to allow for the vertical adjustment of hanger 34 along bolt shank 24.

The system of this invention may be employed as follows for the hanging support of pipes or conduits from an overhead structural member such as a beam or joist. An anchor 40, adapted to threadably engage bolt 17, is fixedly mounted on or in a structural member 41. The shank of bolt 17 is inserted through the hole 15 in the face of upper end cap 14 and is threaded into anchor 40 thus securing the face of cap 14 tightly against anchor 40. Pipe 12 is cut to a length which will support a conduit at a predetermined elevation below structural member 41.

An adhesive, suitably a solvent adhesive of the type used to join PVC plumbing components, is applied to the interior of cap 14 or to an exterior end of pipe 12 or to both. The pipe end is inserted into cap 14 whereby the two components are bonded. Shank 24 of bolt 25 is then inserted through centered hole 21 of cap 20 and is secured thereto by nut means 27. Cap 20 is then adhesively bonded to the downwardly extending end of pipe 12 in a manner described previously.

A hanger member 35 is attached to bolt 25 and is arranged to cradle and support a pipe or duct 34 at a fixed elevation relative to the lower end of pipe 12. Hanger 35 comprises a band of circular or semi-circular shape and is arranged with one or more apertures sized for insertion of bolt shank 24 therethrough and adjustably secured thereon by means of nuts 27 and 29. Washers 30 and 31 may be placed on the bolt shank at the top and the bottom of hanger 35 respectively.

Figure 3:
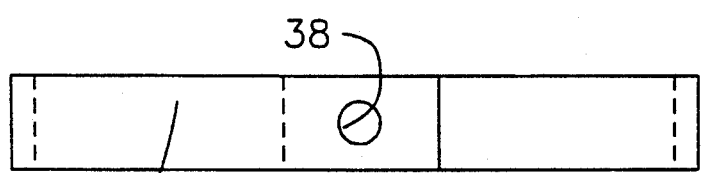
FIG. 3 is plan view of the hanger component of FIG. 1.
Figure 4:
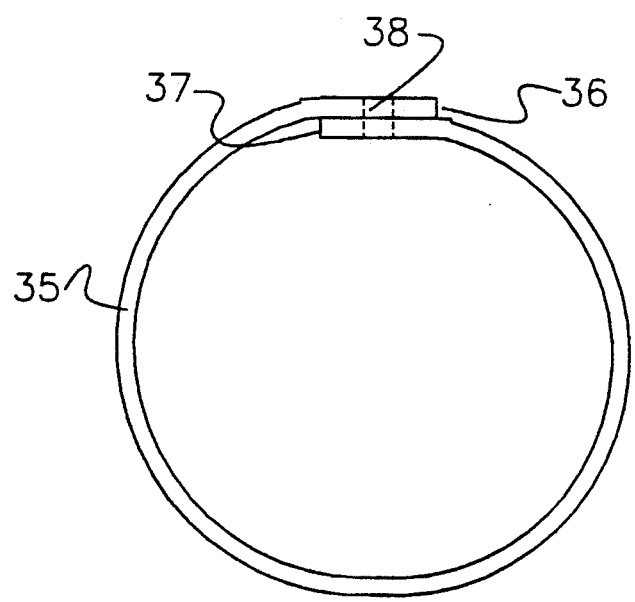
FIG. 4 is a front elevational view of the hanger component of FIG. 3.

In a preferred embodiment, hanger 35 comprises a circular band of generally uniform cross-section with overlapping superposed ends 36 and 37 as is illustrated in FIGS. 3 and 4. A hole 38, sized to accept bolt shank 24, is drilled through the superposed ends 36 and 37 of hanger 35. Hanger 35 is preferably fabricated of a plastic material which suitably may be PVC.

Figure 5:
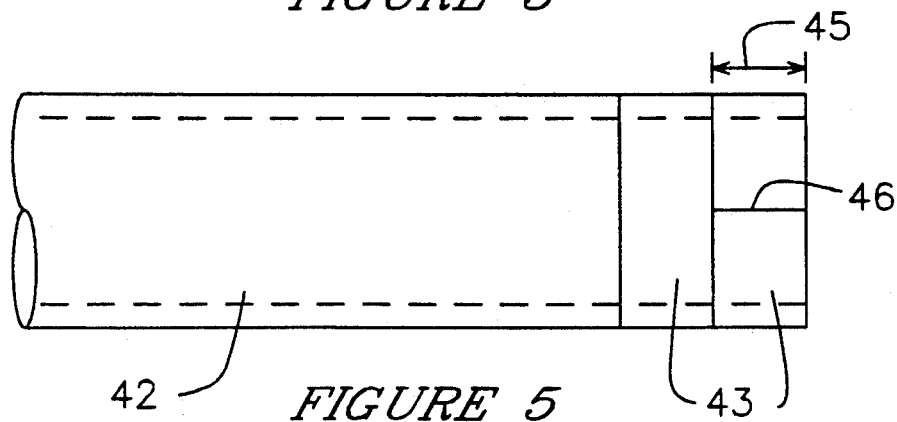
FIG. 5 is a plan view illustrating fabrication of the hanger component of FIG. 3.

It has been found that hanger 35 may be advantageously manufactured from standard, thick walled, PVC piping in a manner illustrated in FIG. 5. A thick walled plastic pipe 42, suitably Schedule 40 PVC pipe having a diameter some 2 inches or so larger in diameter than that of supported pipe or conduit 34, and typically some 4 to 6 inches in diameter, is cut into right cylinders 43, the end planes of each such right cylinder being substantially parallel one with the other and perpendicular to the axis of the pipe. Each such right cylinder 43 cut from pipe 42 has a height 45 less than, and preferably substantially less than, its diameter. In a practical sense, cylinder height 45 may range from about 10% to about 50% of the pipe diameter or from about one-half inch to about 3 inches for a 6-inch diameter pipe. The thickness of the cylinder wall may suitably range from about one-eighth inch to about one-half inch and preferably is in the range of one-fourth inch to three-eighths inch for a six-inch diameter cylinder.

After a cylinder 43 has been severed from pipe 42 a cut 46 is made through the cylinder wall generally parallel to the axis of the cylinder. Residual stresses from the pipe manufacturing process cause the ends of the cut cylinder to overlap thus fashioning a band with overlaying superposed ends having the configuration generally depicted in FIG. 4. Thereafter, hole 38 is drilled through the overlapping, superposed ends of cylinder 43 to thus form the preferred embodiment of hanger 35.

It can thus be appreciated that this invention provides a pipe hanger system that will reliably support pipes and duct work in hostile and corrosive environments for an extended period of time without the need for maintenance of any kind. Further, the pipe hanger system of this invention is relatively inexpensive to manufacture and is quickly and efficiently installed with a minimum of labor.

The invention has been described in terms of the presently preferred embodiments but it will be understood that various alterations and modifications will become apparent to those skilled in the art after having read the above disclosure. Accordingly it is intended that the appended claims be interpreted as covering such alterations and modifications as fall within the spirit and scope of the invention.

I claim:

1. A pipe support and hanger system for use in corrosive environments comprising:
   a cylindrical support member comprising a heavy-walled plastic pipe;
   a first cap member, said cap member comprising a cylinder having one closed end, the inside diameter of said cylinder being sized to snugly fit over a first end of said plastic pipe and adhesively joined thereto;
   first attachment means cooperating with said first cap member to affix said cap member to an overhead support;
   a second cap member, said cap member comprising a cylinder having one closed end, the inside diameter of said cylinder being sized to fit over the other end of said plastic pipe and adhesively joined thereto;
   a hanger member arranged to cradle and support a pipe or duct at a fixed elevation relative to the lower end of said plastic pipe; and
   second attachment means arranged to fasten said second cap member to said hanger member.

2. The system of claim 1 wherein said first cap member is arranged with a centered hole in said closed end.

3. The system of claim 2 wherein said first attachment means comprises a bolt having a threaded shank extending through said centered hole for threadable attachment to an anchor fixed to said overhead support.

4. The system of claim 1 wherein said second cap member is arranged with a centered hole in said closed end.

5. The system of claim 4 wherein said second attachment means comprises a bolt having a threaded shank extending outwardly through the centered hole in said second end cap and secured thereto by means of a nut, a length of said threaded shank extending beyond said nut.

6. The system of claim 5 wherein said hanger member comprises a band arranged with an aperture sized for insertion of the extended length of said threaded bolt shank, said band secured to said bolt shank by means of a nut.

7. The system of claim 6 wherein said hanger member comprises a generally circular band of a plastic material, said band having two ends arranged in an overlapping, superposed attitude, said overlapping ends having a hole drilled therethrough for insertion of the extended length of said threaded bolt shank.

8. The system of claim 7 wherein said hanger member comprises a right circular cylinder cut from a heavy-walled PVC pipe, the wall of said cylinder being severed along a line generally parallel to the cylinder axis to form a generally circular band having two band ends.

9. The system of claim 1 wherein said heavy-walled plastic pipe is PVC having an internal diameter between one-half and one inch.

10. A method for making a pipe hanger for use in corrosive environments comprising:
    cutting a heavy-walled PVC plastic pipe to form a right cylinder having a height less than the pipe diameter, said PVC pipe having residual stresses from its manufacture;
    making a cut completely through the wall of said cylinder, said cut being generally parallel to the cylinder axis to thereby form a circular band having two band ends;
    allowing said residual stresses to arrange said band ends in an overlapping superposed attitude; and
    drilling a hole through said overlapped superposed band ends, said hole sized to allow passage of fastener means for connection of said hanger to a support member.

11. The method of claim of claim 10 wherein the diameter of said pipe ranges from about 4 inches to about 6 inches, wherein the thickness of said pipe wall ranges from one-eighth inch to one-half inch and wherein the height of said cylinder ranges from about one-half inch to 3 inches.

12. The method of claim 10 wherein the height of said right cylinder is in the range of 10% to 50% of the pipe diameter.

13. A method for making a pipe support and hanger system comprising;
    cutting a cylindrical member to a length needed to maintain a tubular body at a desired elevation below an overhead support structure;
    arranging one end of said cylindrical member for attachment to said overhead support structure;
    arranging the other end of said cylindrical member for connection to a hanger;
    making said hanger from a heavy-walled PVC plastic pipe by cutting said pipe to form a right cylinder having a height less than the pipe diameter and thereafter making a cut completely through the wall of said right cylinder, said cut being generally parallel to the cylinder axis to thereby form a circular band having two band ends, allowing stresses residing in said pipe to arrange said band ends in an overlapping superposed attitude, and drilling a hole through said overlapped superposed band ends; and
    connecting said hanger to said other end of said cylindrical member using fastener means passing through said hole.

14. A method for suspending a tubular body from an overhead structure comprising:
    mounting an anchor on an overhead structural member from which said tubular body is to be suspended, said anchor arranged to threadably accept a bolt;
    inserting the threaded shank of a bolt through a centered hole in the closed end of a first cap member, said first cap member comprising a cylinder having one open end and one closed end, and securing said cap member to said anchor by means of said bolt;
    inserting one end of a pipe into the open end of said first cap member, the outside diameter of said pipe selected to provide a snug fit with the inside of said member, and adhesively fastening said pipe to said cap member;
    inserting the threaded shank of a bolt through a centered hole in the closed end of a second cap member, said second cap member comprising a cylinder having one open end and one closed end, and securing said bolt to said second cap member by means of a nut, the threaded shank of said bolt extending beyond said nut;

mounting said second cap member on the other end of said pipe, the inside diameter of said second cap member being sized to provide a snug fit about the outside of said pipe, and adhesively fastening said pipe to said second cap member; and mounting a hanger member onto the threaded shank portion of said bolt extending beyond said nut and securing said hanger member to said bolt by means of a second nut, said hanger member comprising a band of generally circular shape and having an aperture for insertion of said bolt shank therethrough.

15. The method of claim 14 wherein said pipe, both said end caps and said hanger member are fabricated from PVC.

16. The method of claim 14 wherein said hanger member comprises a circular band of PVC having a generally uniform cross-section with overlapping superposed ends, said superposed ends having a hole drilled therethrough to accommodate said bolt shank.

* * * * *